United States Patent [19]

Hoover et al.

[11] Patent Number: 4,770,613

[45] Date of Patent: Sep. 13, 1988

[54] APPARATUS FOR DISPENSING VISCOUS LUBRICANT

[76] Inventors: Steven J. Hoover, 7331 W. County Rd. 38, Fostoria, Ohio 44830; Charles M. Stewart, 525 S. Sandusky, Tiffin, Ohio 44883

[21] Appl. No.: 87,325

[22] Filed: Aug. 20, 1987

[51] Int. Cl.⁴ .............................................. F04B 15/02
[52] U.S. Cl. .................................... 417/411; 417/315; 222/383; 141/27; 184/105.2
[58] Field of Search ................. 417/315, 411; 227/325, 227/383, 412, 413, 372; 141/2, 27, 258–262, 25, 26; 184/105.1, 105.2

[56] References Cited

U.S. PATENT DOCUMENTS

| | | | |
|---|---|---|---|
| Re. 26,180 | 4/1967 | Frenzel et al. | 141/27 X |
| 987,962 | 3/1911 | Courtney | 417/315 |
| 3,987,869 | 10/1976 | Bowers | 184/105.1 |
| 4,004,862 | 1/1977 | Hill | 417/411 X |
| 4,144,913 | 3/1979 | Akers et al. | 141/2 |
| 4,257,540 | 3/1981 | Wegmann et al. | 417/411 X |

Primary Examiner—Carlton R. Croyle
Assistant Examiner—Eugene L. Szczecina, Jr.
Attorney, Agent, or Firm—David C. Purdue; John C. Purdue

[57] ABSTRACT

A device for dispensing a viscous fluid from and charging a viscous fluid into a canister mounted on a housing of the device is disclosed. The device comprises a reversible auger-type pump including an auger having first and second ends. The first end of the auger is in communication with a nozzle conduit for conducting a viscous fluid between the first end of the auger and a nozzle provided on the nozzle conduit. The second end of the auger is in communication with the canister. The device further includes a motor and associated gearing for connecting the motor to the auger in driving relationship. Power cell means are provided to supply current to the motor. The polarity of the current so supplied is controllable by a switch so that, when current of a given polarity is supplied to the motor, the auger will rotate in a first direction to fill the canister and when the polarity of the current is reversed, the auger will rotate in the opposite direction to dispense from the canister. The device may be equipped with a two-speed gear box to provide additional control over discharge and filling rates in response to a variety of considerations including fluid viscosity. Additionally, the dispenser may be equipped for discharging a metered amount of fluid.

21 Claims, 3 Drawing Sheets

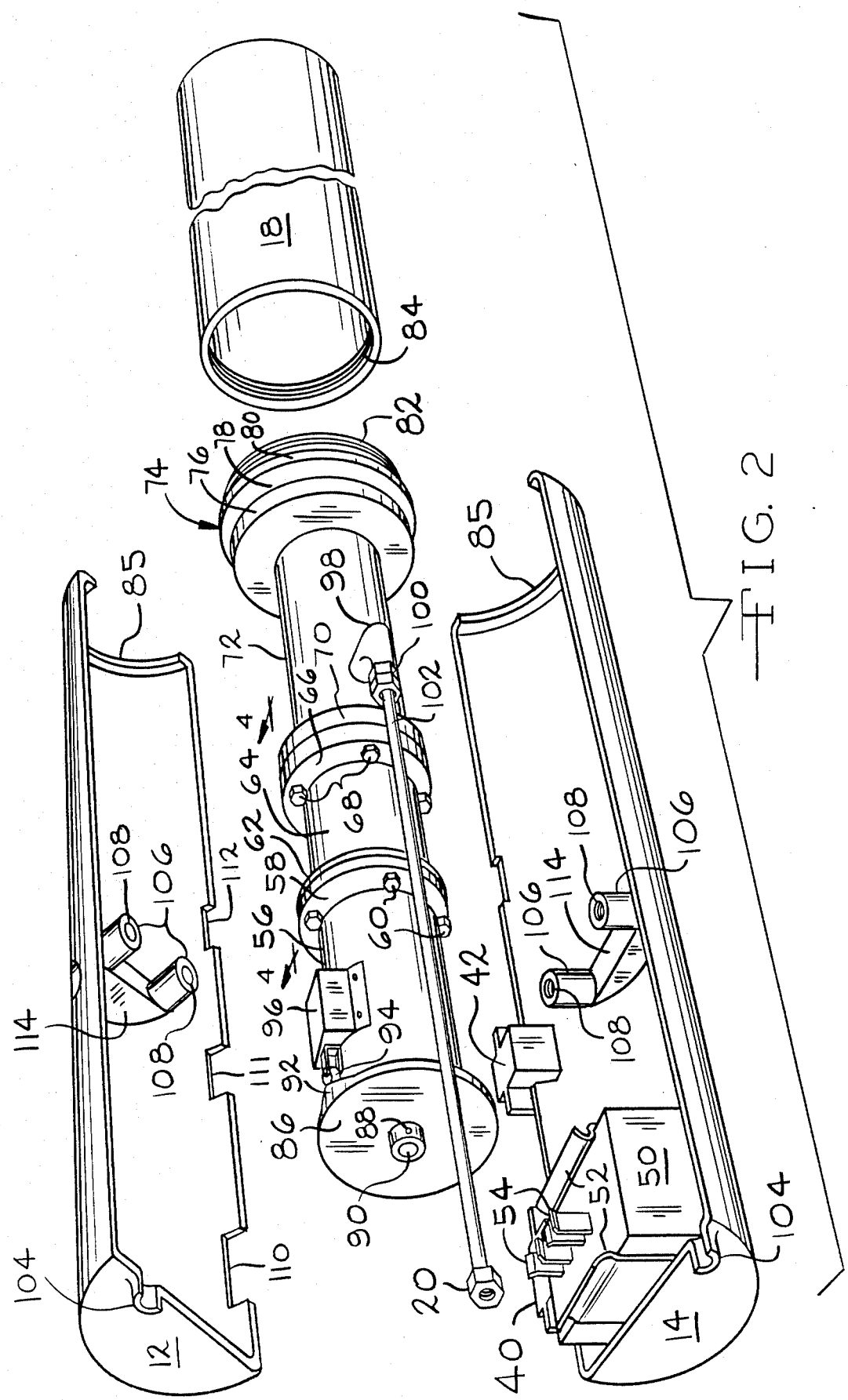

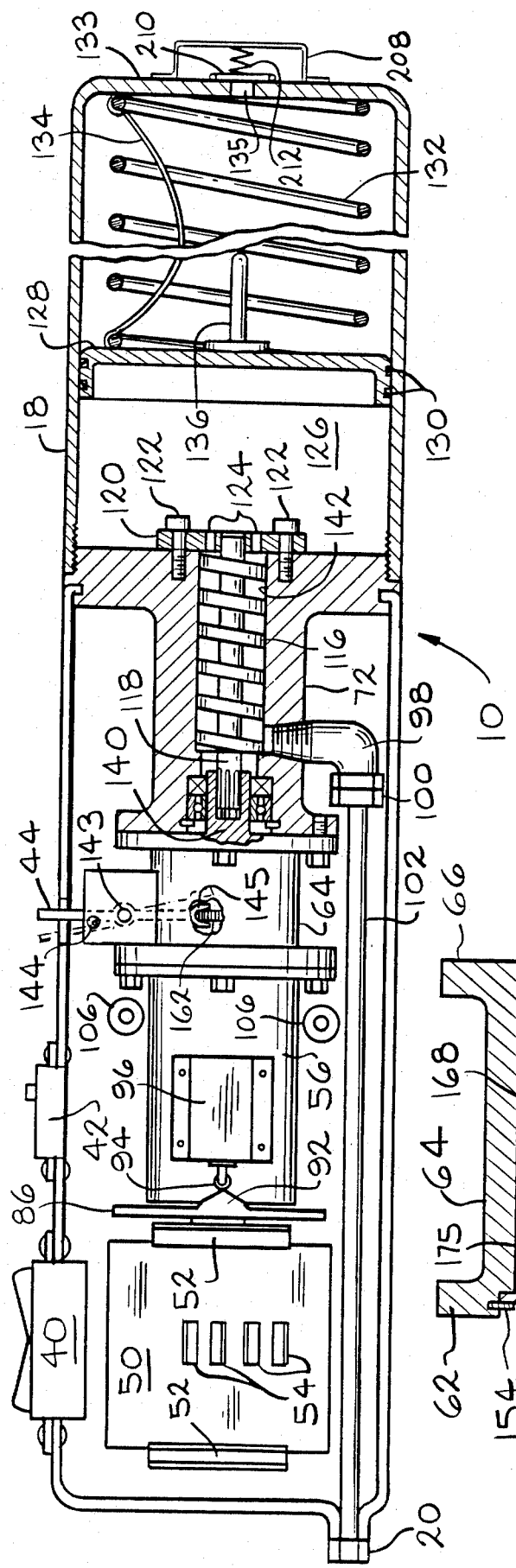
FIG. 3
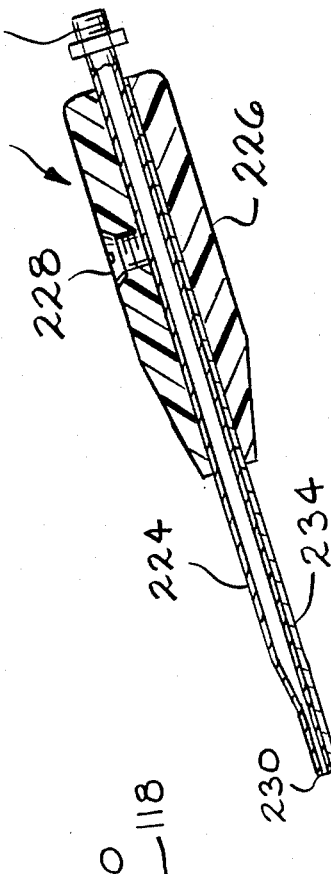
FIG. 6
FIG. 4

APPARATUS FOR DISPENSING VISCOUS LUBRICANT

BACKGROUND OF THE INVENTION

1. Field of the Invention

The present invention relates generally to devices for dispensing viscous fluids including such diverse materials as grease and joint compound. More specifically, the present invention is concerned with dispensing devices which are hand-held and have provisions for discharging a viscous fluid from and charging a viscous fluid to a canister through a common conduit.

2. Description of the Prior Art

U.S. Pat. No. 2,430,608 discloses a service station installation including stationary grease pumps operated by compressed air, electricity or the like and mounted on grease drums. Such apparatus is in wide use and works very well in locations having a readily accessible source of compressed air or electricity.

Hand-held, manually operated grease guns are also known. Such grease guns are designed for use with a grease canister and include a manually operated mechanism for pressurizing grease and causing it to flow out of the through a conduit to a suitable coupling.

U.S. Pat. No. 3,987,869 entitled "Back Pack Lubrication System" discloses a motorized, back pack mounted grease dispensing device. The device includes grease cylinders and spring urged pistons for pressurizing grease within the cylinders, a conduit connecting the grease cylinders to a pump and a conduit connecting a discharge port of the pump to a grease gun. This device also includes a motor to supply shaft power to the pump and a battery power pack for supplying current to the motor. The patent discloses that the pump can be of the auger-type or of the piston type. The grease cylinders are provided with a detachable cap to enable the operator to remove the piston and refill the grease cylinders.

SUMMARY OF THE INVENTION

The present invention is a device for dispensing a viscous fluid from and charging a viscous fluid into a canister mounted on a housing of the device. Also mounted in the housing is a reversible auger-type pump including an auger having first and second ends. The first end of the auger is in communication with a nozzle conduit for conducting a viscous fluid between the first end of the auger and a nozzle provided on the nozzle conduit. The second end of the auger is in communication with the canister. The device further includes a motor and associated gearing for connecting the motor to the auger in driving relationship. Power cell means are provided to supply current to the motor. The polarity of the current so supplied is controllable by a switch so that, when current of a given polarity is supplied to the motor, the auger will rotate in a first direction and when the polarity of the current is reversed, the auger will rotate in a second opposite direction. When the auger is rotated in the first direction, it pumps a fluid from the nozzle conduit into the canister thereby filling it. When the auger is rotated in the opposite direction, it serves to pump fluid from the canister to and through the nozzle conduit for discharge. The device may be equipped with a two-speed gear box to provide additional control over discharge and filling rates in response to a variety of considerations including fluid viscosity. Additionally, the dispenser may be equipped for discharging a metered amount of fluid.

Accordingly, it is an object of the present invention to provide a device for dispensing a viscous fluid from and charging a viscous fluid into a canister expeditiously and conveniently.

Other objects as well as advantages of the present invention will be apparent from the following detailed description of the invention with reference to the appended drawings.

BRIEF DESCRIPTION OF THE DRAWINGS

FIG. 2 is an exploded perspective view of the device shown in FIG. 1.

FIG. 3 is a cross-sectional view taken along the line 3—3 of FIG. 1.

FIG. 4 is a cross-sectional view taken through a gear box along the lines 4—4 shown in FIG. 2.

FIG. 6 is a sectional view through an attachment for use with the dispensing device for dispensing and applying joint compound to dry wall.

DETAILED DESCRIPTION OF THE INVENTION

Figure 1:
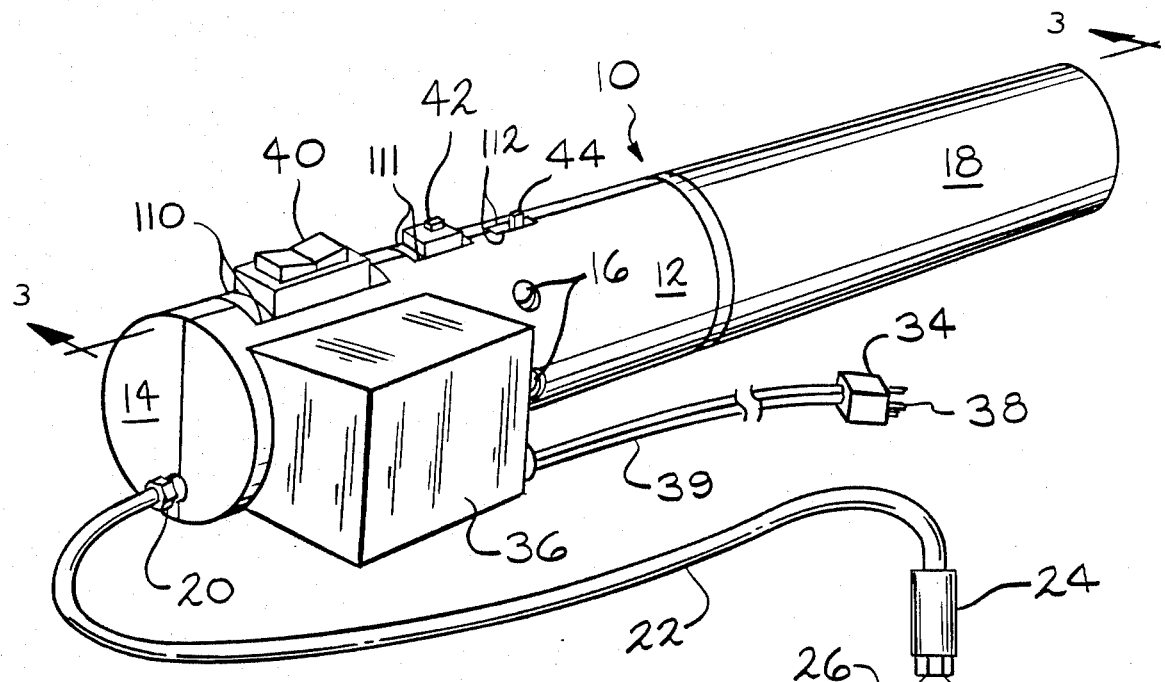
FIG. 1 is a perspective view of a drum of lubricant and a dispensing device incorporating features of the present invention and including means adapting the device for use in dispensing grease.

With reference to FIG. 1, a device according to the present invention for dispensing a viscous fluid is indicated generally at 10. The device 10 comprises a housing having a first half 12 and a second half 14. The two halves are secured together by fasteners 16. A fluid canister 18 is attached to the housing. A fitting 20 is secured to an end of the housing opposite the fluid canister 18. Connected to and extending from the fitting 20 is a conduit 22 provided with a coupling 24. In FIG. 1, the coupling 24 is shown attached to a cone-shaped cover 26 of an associated drum 28 containing a lubricant 30. The drum 28 has a cone-shaped bottom 32 corresponding dimensionally with the cover 26. A spring 33 is positioned below the bottom 32 and biases it towards the top 26.

A conventional A.C. adapter 34 is wired to a base 36. The adapter 34 includes prongs 38 for insertion in a suitable A.C. power outlet (not shown). A power cord 39 electrically connects the adapter 34 with the base 36. The device 10 includes a first switch 40 and a second switch 42 as well as associated circuitry for controlling the distribution of power delivered to the device 10 from the adapter 34. The circuitry is discussed below in detail. A gear shift lever 44 is provided to select one of two gear combinations as discussed below in connection with FIGS. 3 and 4.

Turning now to FIG. 2, the contents of the housing halves 12 and 14 are shown. A power cell 50 is secured in the housing half 14 by clips 52. Power input terminals 54 of the bayonet type extend from the power cell 50. The terminals 54 are positioned to be accessible through apertures (not shown) provided in the housing half 12 for electrical connection with a suitable source of external power such as the base 36 (FIG. 1). Preferably, the adapter 34 is operable to convert A.C. power to D.C. power. It is also preferred that the power cell 50 is operable to store D.C. power produced by the adapter 34 for selectively supplying it to a motor. Alternative, the power cell 50 can comprise one or more non-rechargeable batteries thereby obviating the base 36 and adapter 34. In either case, the power cell 50 would constitute a self-contained source of power for the device 10 making it portable. It will be readily appreciated by those skilled in the art that other means for supplying power to a motor could be used in the device 10. For example, the power cell 50 could comprise an A.C. to D.C. adapter making the device 10 dependent on an external source of A.C. power.

The power cell 50 and associated circuitry discussed hereinbelow selectively provide power to a motor (not shown) mounted in a motor housing 56. An annular flange 58 is provided on the motor housing 56 and is coupled by suitable fasteners 60 to a corresponding flange 62 provided at one end of a gear box housing 64. Another flange 66 is provided at the other end of the gear box housing 64 which, in turn, is coupled by fasteners 68 to an adjacent flange 70 provided at one end of a pump housing 72. A complex flange 74 is provided at the other end of the pump housing 72. The complex flange 74 comprises a first flange 76, a groove 78, a larger second flange 80 and an exteriorly threaded section 82. Corresponding interior threads 84 are provided at one end of the fluid canister 18 for selective engagement with the threaded portion 82 of the complex flange 74 on the pump housing 72. Flanges 85 are provided at one end of the housing halves 12 and 14 and are configured to be received in the groove 78 when the device 10 is assembled.

A wheel 86 is secured by a fastener 88 to a motor shaft 90. The wheel 86 includes a depending cam 92 which is positioned to intermittently engage a cam follower 94 which is mounted on a switch 96. When activated, the switch 96 is operable to maintain a closed circuit between the power cell 50 and the motor in the motor housing 56 except when the cam 92 engages the cam follower 94. This provides a metering function for the pump housed in housing 72. This function will be described in more detail hereinbelow.

One end of an elbow 98 is connected to a port in the pump housing 72. A conduit coupling 100 is secured to the other end of the elbow 98 coupling it to one end of a conduit 102. The fitting 20 is provided at the other end of the conduit 102. The housing halves 12 and 14 are provided with conduit engaging flanges 104 adapted to snugly engage the conduit 102 when the halves 12 and 14 are assembled. Posts 106 provided in the housing halves 12 and 14 define internal bores 108 sized t receive fasteners 16 (FIG. 1). Notches 110, 111 and 112 are provided in the housing halves 12 and 14 to accommodate the switches 40 and 42 and the gear shift lever 44 (FIG. 1), respectively. A support block 114 is provided in each of the housing halves 12 and 14. Each block 114 is sized so that, when the halves 12 and 14 are assembled, the blocks 114 securely support the motor housing 56 and the other housings within the housing halves 12 and 14.

With reference to FIG. 3, details regarding the operation of the device 10 will now be described. Mounted for rotation within the pump housing 72 is an auger vane 116 mounted on a shaft 118. One end of the shaft 118 is journaled for rotation in a bearing plate 120 which is secured to the pump housing 72 by fasteners 122. Apertures 124 in the bearing plate 120 provide communication between the auger vane 116 and a fluid reservoir 126 which is defined, in part, by the fluid canister 18. The fluid reservoir 126 is further defined by a pressure plate 128 which is slidably mounted for axial movement within the canister 18. A seal is effected between the lubricant canister 18 and the pressure plate 128 by ring seals 130. A spring 132 is dimensioned and positioned to urge the pressure plate 128 towards the pump housing 72 and away from an end 133 of the fluid canister 18. One end of a cable 134 is secured to one end of the spring 132 while the other end of the cable 134 is secured to the other end of the spring 132 to prevent overextension of the spring. The spring places fluid within the fluid reservoir 126 under a positive pressure. The fluid canister 18 is vented at 135 to maintain atmospheric pressure on the non-pressure side of the pressure plate 128. When the reservoir 126 is full, the spring 132 will be compressed so that a post 136, mounted on the pressure plate 128, will extend through the vent 135 to provide a visual signal indicating that the reservoir 126 is full.

The auger shaft 118 is mounted for rotation in the pump housing 72. The end of the auger shaft 118 which is opposite the end mounted in the bearing plate 120 is concentrically mounted within a gear box output shaft 140. There is a splined connection between the shaft 140 and the auger shaft 118 so that the former, when it is rotating, drivingly engages the latter. In a known manner, rotation of the auger shaft 118 and, with it, the auger vane 116 within a bore 142 of the pump housing 72 will impart kinetic energy to a fluid. Rotation of the auger vane 116 in a first direction will impart kinetic energy to a fluid in the elbow 98 and thereby move it through the bore 142 of the pump housing 72, through apertures 124 in the bearing plate 120 and into the fluid reservoir 126. Rotation of the auger vane 116 and the shaft 118 in the opposite direction effects an opposite flow, drawing fluid from the fluid reservoir 126 through the apertures 124 in the bearing plate 120, through the bore 142 of the pump housing 72 and into the elbow 98.

The rotational speed of the output shaft 140 is determined in part, by the position of the shift lever 44 which is mounted for rotation about a pivot 143 between a first position illustrated in FIG. 3 and a second position illustrated in phantom lines in FIG. 3. A detente 144 serves to retain the shift lever 44 in the first or second position. In the first position, a shift fork 145 provided on the lever 44 maintains a gear 162 in a first position. When the lever 44 is in the second position, the shift fork 145 maintains the gear 162 in a second position. The function of gear 162 is explained below.

With reference to FIG. 4, the operation of a gear box in gear box housing 64 will be described. The gear box is designed to receive power from a motor output shaft 146. A reduced diameter portion 148 of the shaft 146 is splined to drivingly engage a gear box input shaft 150. A bearing plate 152 is retained in the gear box housing 64 by a snap ring 154. The input shaft 150 is rotatably mounted in a bearing 156 and a seal 158 which are retained in the bearing plate 152 by snap rings 160 and 161. A driving gear 162 is slidably mounted on a reduced diameter portion 164 of the input shaft 150 and retained thereon by a cap 166. The driving gear 162 is shown in a first position in FIG. 4 where it is in driving engagement with a first gear 167 provided on an idler gear assembly 168. A second gear 170 of the idler gear assembly 168 is in driving engagement with a first geared portion 172 of the gear box output shaft 140. The idler gear assembly 168 is mounted for rotation on a shaft 174 and is positioned thereon by spacers 175 and 176 between the bearing plate 152 and a gear box housing plate 178. The gear box output shaft 140 is mounted for rotation within the gear box housing plate 178. The gear box output shaft 140 is rotatably mounted in a bearing 179 and a seal 180 which are retained in the gear box housing plate 178 by the first geared portion 172 of the output shaft 140 and a snap ring 182. A second idler gear assembly 184 includes a gear 186 mounted for rotation on a shaft 187 between spacers 188 and 189. The gear 186 is in driving engagement with a reduced gear portion 190 of the gear box output shaft 140.

The driving gear 162 is mounted on the reduced diameter portion of the gear box input shaft 150 for movement between the first position illustrated for it in FIGS. 3 and 4 and a second position illustrated for it in phantom lines in FIG. 4. In the second position, the driving gear 162 is in driving relationship with the gear 186 which, in turn, is in driving relationship with the reduced gear portion 190 of the gear box output shaft 140. When the driving gear 162 is in the first position, the gear box will transmit rotation of the motor output shaft 146 to the gear box output shaft at a given ratio. When the driving gear 162 is in the second position, rotation of the motor output shaft 146 will be transmitted at a ratio which is lower than the given ratio to the gear box output shaft 146. Shifting of the driving gear 162 between the first and second position can be carried out by pivoting the gear selector lever 44 and the appended shift fork 145 about the pivot 143.

Figure 5:
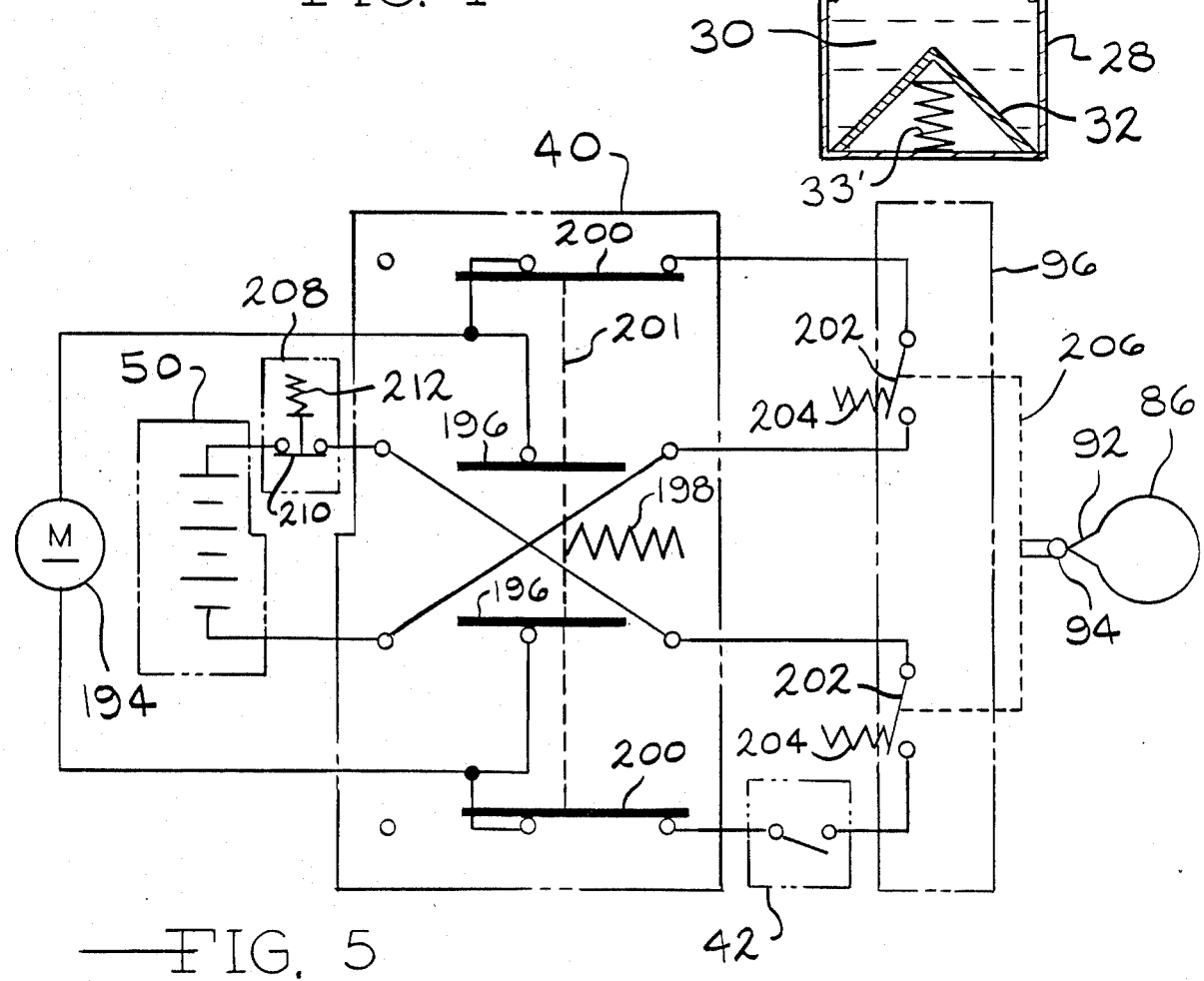
FIG. 5 is a schematic circuit diagram for the device of the present invention.

With reference to FIG. 5, circuitry for controlling the components of the dispensing device 10 will now be described.

A motor suitable for incorporation into a device embodying the present invention is indicated schematically at 194. The motor 194 is shown electrically connected to the center poles of switch 40, illustrated in FIG. 5 as a ganged four pole switch. A pair of interior maker bars 196 are illustrated in a central position in the switch 40. The maker bars 196 are adapted to be moved to the right to the extent that they make a circuit between the power cell 50 and the motor 194 so that current of a given polarity is delivered to the motor 194 causing it to rotate in a "forward" direction. Similarly, the maker bars 196 are adapted to be moved from the position illustrated in FIG. 5 to the left thereby making a circuit between the power cell 50 and the motor 194 so that current of a polarity opposite that of the given polarity is delivered to the motor 194 causing it to rotate in a reverse direction. A spring 198 is provided in the switch 40 to give the right-hand side of the switch 40 momentary action, i.e., when released, the maker bars 196 will return to the central position illustrated in FIG. 5 by the action of spring 198. Maker bars 200 are coupled by a non-conducting rod 201 to the maker bars 196 for movement therewith.

The circuitry illustrated in FIG. 5 includes a switch 96 and associated elements which, together, serve a metering function by maintaining the flow of current through the motor 194, even when the maker bars 198 and 200 are in the neutral position, until the motor 194 has completed a cycle. In the embodiment illustrated in FIG. 5, one cycle corresponds with a complete revolution of a wheel 86 which includes a cam 92. The wheel 86 is adapted to be mounted on the shaft of the motor 194. The beginning and end of the cycle occurs each time the cam 92 engages a cam follower 94. Operatively associated with the cam follower 94 is the switch 96 including a pair of internal switches 202. The switches 202 are biased towards a closed position by springs 204. Coaction between the cam 92 and the cam follower 94 at the end of a cycle causes a displacement of the cam follower 94 to the position illustrated for it in FIG. 5. This displacement is transmitted to the switches 202 through means 206 thereby opening the switches 202 as illustrated in FIG. 5. When the wheel 86 is rotated from the position illustrated in FIG. 5, the springs 204 will close the switches 202 to provide a closed circuit between the power cell 50 and the motor 194 through the outside maker bars 200 when they are in the central position or the forward position. The metering function can be disabled through switch 42 by opening it. When the switch 42 is open, current will not be supplied to the motor when the maker bars 200 and 196 are in the central position. With the maker bars 196 and 200 in the central position and switch 42 in the closed position, current will be supplied to the motor 194 until a cycle is completed and the wheel 86 rotates to the position illustrated in FIG. 5. The several modes of operation of the device 10 will now be discussed in connection with charging and discharging lubricant to and from the device 10.

Charging of lubricant 30 (FIG. 1) from a drum 28 into the fluid canister 18 involves bringing the coupling 24 into engagement with the cover 26 of the drum 28. The gear shift lever 44 can be in the first or second position although it is believed that a low ratio gearing is more suitable for use in connection with charging fluid into the lubricant canister 18. The switch 42 can be open or closed but there is no reason for the cycling function to be operable during this mode of operation. Lubricant 30 is then charged into the fluid canister 18 upon movement of the switch 40 to the reversing position. Preferably, lubricant 30 in the lubricant drum 28 is placed under pressure by the spring 33 or by urging the cover 26 towards the bottom 32 of the drum 28. This will create a positive pressure within the lubricant drum 28 thereby urging lubricant 30 to flow through the coupling 24, into and through the conduit 22, through the fitting 20, through the conduit 102 (FIG. 2), the conduit coupling 100, the elbow 98 and into the bore 142 of the pump where rotation of the auger vane 116 will pump the lubricant through apertures 124 in the bearing plate 120 and into the fluid reservoir 126. As the lubricant 30 enters the fluid reservoir 126, it will displace the pressure plate 128 against the force of the spring 132. When the fluid reservoir 126 is full, the switch 40 can be opened to deactivate the motor 194 thereby completing the process of charging the fluid reservoir 126. Alternatively, means including a switch 208 can be provided to cooperate with post 136 to deactivate the motor 194 when the reservoir 126 is full. As shown in FIG. 3, the switch 208 includes a maker bar 210 which is urged by a spring 212 to a closed position. When the reservoir 126 is full, the pressure plate 128 and the post 135 mounted thereon will be displaced from the positions illustrated for them in FIG. 3 to the right until the post 136 engages the maker bar 210 and moves it against the force of the spring 212 to open the switch 208. As shown in FIG. 5, the switch 208 is positioned in the reversing circuit so that when the switch 208 is open, motor 194 will not run in reverse.

Fluid dispensing is commenced by positioning the switch 40 in the forward position thereby causing current to flow from the power cell 50 to the motor 194 which is operatively coupled to the auger shaft 118 through the gearing housed in gear box housing 64. Rotation of the auger shaft 118 and, with it, the auger vane 116, will draw lubricant from the fluid reservoir 126 through the aperture 124 in the bearing plate 120 and through the bore 142 in the pump housing 72. From the pump housing 72, lubricant will then flow through elbow 98, conduit coupling 100, conduit 102 and coupling 20. If the switch 42 is open, lubricant dispensing will cease immediately upon the switch 40 being returned to the central or neutral position. If, on the other hand, the switch 42 is closed, lubricant dispensing will continue after the switch 40 is returned to the central or neutral position and until a cycle is completed and the cam 92 engages the cam follower 94.

Referring now to FIG. 6, a joint compound attachment for the device 10 is indicated generally at 220. The attachment 220 includes a coupling 222 adapted for connection with the fitting 20 or the coupling 24 of the device 10. The coupling 22 is provided at one end of a conduit 224 which is slidably mounted in a handle 226. A set screw 228 is provided in the handle 226 to engage the conduit 224 and prevent it from sliding. Thus, a discharge end 230 of the conduit 224 can be positioned a desired distance from a forward edge 232 of a blade 234. The blade 234 is preferably a resilient blade of the type normally found on putty knives used in connection with the applicant of joint compound to a dry wall joint. Joint compound can be charged into the fluid reservoir 126 and discharged through the joint compound attachment 220 onto the blade 234 for direct application to a wall board joint.

In addition to grease and joint compound, the device 10 is suitable for selectively charging and discharging a variety of other viscous fluids to and from a fluid canister. The foregoing disclosure sets forth the best mode contemplated by the inventors for carrying out the subject invention as of the filing date hereof. It will be apparent to those skilled in the art that the present invention is susceptible of numerous modifications and variations all within the spirit and scope of the appended claims.

We claim:

1. A device for dispensing fluid from and charging fluid to a fluid reservoir, said device comprising, in combination;

a fluid canister defining a fluid reservoir, auger-type pump means having first and second ports, said first port being in communication with said fluid reservoir, a conduit coupled to said second port and in communication therewith, a reversible electric motor coupled to said auger-type pump means, a power cell including circuitry connected to said motor and said power cell, said circuitry including a switch having a first position, a second position and a neutral position, said circuitry being operable, when said switch is in said first position, to deliver current of a given polarity from said power cell to said motor to cause said pump to pump fluid from said fluid canister to said fluid conduit, said circuitry being operable, when said switch is in said second position, to deliver current of a polarity opposite that of the given polarity from said power cell to said motor to cause said pump to pump fluid from the fluid conduit into said fluid canister, spring means for pressurizing fluid in said fluid canister and metering means operable, when said switch is moved from said first position to said neutral position, to maintain the flow of current of the given polarity to said motor until the completion of one cycle.

2. The device claimed in claim 1 and further comprising a two ratio gear box coupling said motor to said pump means and an externally accessible gear ratio select lever.

3. The device claimed in claim 1 wherein one cycle is one revolution of the motor.

4. The device claimed in claim 1 wherein said power cell is rechargeable.

5. The device claimed in claim 2 wherein said power cell is rechargeable.

6. The device claimed in claim 1 and further comprising refill cut-off switch means for interrupting the flow of current to said motor when said switch is in the second position and said reservoir is substantially full.

7. A device for dispensing fluid from and charging fluid to a fluid reservoir, said device comprising, in combination, a fluid canister defining a fluid reservoir, auger-type pump means having first and second ports, said first port being in communication with said fluid reservoir, a conduit coupled to said second port and in communication therewith, a reversible electric motor coupled to said auger-type pump means, a power cell including circuitry connected to said motor and said power cell, said circuitry including a first switch having a first position, a second position and a neutral position, said circuitry being operable, when said first switch is in said first position, to deliver current of a given polarity from said power cell to said motor to cause said pump to pump fluid from said fluid canister to said fluid conduit, said circuitry being operable, when said first switch is in said second position, to deliver current of a polarity opposite that of the given polarity from said power cell to said motor to cause said pump to pump fluid from the fluid conduit into said fluid canister, spring means for pressurizing fluid in said fluid canister, and refill cut-off means including a second switch in said power cell circuitry, said second switch being operable in a first position and inoperable in a second position to interrupt the flow of current of a polarity opposite that of the given polarity which would otherwise flow when said first switch is in said second position.

8. The device claimed in claim 7 and further comprising a two ratio gear box coupling said motor to said pump means and an externally accessible gear ratio select lever.

9. The device claimed in claim 7 and further comprising metering means operable, when said first switch is moved form said first position to said neutral position, to maintain the flow of current of the given polarity to said motor until the completion of one cycle.

10. The device claimed in claim 9 wherein one cycle is one revolution of the motor.

11. The device claimed in claim 7 wherein said power cell is rechargeable.

12. The device claimed in claim 8 wherein said power cell is rechargeable.

13. A hand-held device for dispensing fluid form and charging fluid to a fluid reservoir, said device comprising, in combination, a housing, a canister defining a fluid reservoir, auger-type pump means supported in said housing, said pump having first and second ports, said first port being in communication with said fluid reservoir when said canister is supported on said housing, a conduit coupled to said second port and in communication therewith and with the exterior of said housing, a reversible electric motor coupled to said auger-type pump means, a power cell including circuitry connected to said motor and said power cell, said circuitry including a switch having a first position, a second position and a neutral position, said circuitry being operable, when said switch is in said first position, to deliver current of a givne polarity from said power cell to said motor to cause said pump to pump fluid from said fluid canister to said fluid conduit, said circuitry being operable, when said switch is in said second position, to deliver current of a polarity opposite that of the given polarity from said power cell to said motor to cause said pump to pump fluid from the fluid conduit into said fluid canister, spring means for pressurizing fluid in said fluid canister and metering means in said power cell circuitry, said metering mens being operable, when said switch is moved from said first position to said neutral position, to maintain the flow of current to said motor until the completion of one cycle.

14. The device claimed in claim 13 and further comprising a two ratio gear box coupling said motor to said pup means and an externally accessible gear ratio select lever.

15. The device claimed in claim 13 wherein one cycle is one revolution of the motor.

16. The device claimed in claim 13 wherein said power cell is rechargeable.

17. The device claimed in claim 14 wherein said power cell is rechargeable.

18. The device claimed in claim 13 and further comprising refill cut-off switch means for interrupting the flow of current to said motor when said switch is in the second position and said reservoir is substantially full.

19. The device claimed in claim 14 and further comprising refill cut-off switch means for interrupting the flow of current to said motor when said switch is in the second position and said reservoir is substantially full.

20. A device for dispensing fluid from a fluid reservoir, said device comprising, in combination, a fluid canister defining a fluid reservoir, pump means having first and second ports, said first port being in communication with said fluid reservoir, a conduit coupled to said second port and in communication therewith, an electric motor coupled in driving relationship with said pump means, a power cell including circuitry connected to said motor and said power cell, said circuitry including a switch having a first position and a neutral position, said circuitry being operable, when said switch is in said first position, to deliver current of a given polarity from said power cell to said motor to cause said pump to pump fluid from said fluid canister to said fluid conduit, spring means for pressurizing fluid in said fluid canister and metering means operable, when said switch is moved from said first position to said neutral position, to maintain the flow of current to the given polarity to said motor until the completion of one cycle.

21. A hand-held device for dispensing fluid from a fluid reservoir, said device comprising, in combination, a housing, a canister defining a fluid reservoir, pump means supported in said housing, said pump having first and second ports, said first port being in communication with said fluid reservoir when said canister is supported on said housing, a conduit coupled to said second port and in communication therewith and with the exterior of said housing, an electric motor coupled to said pump means, a power cell including circuitry connected to said motor and said power cell, said circuitry including a switch having a first position and a neutral position, said circuitry being operable, when said switch is in said first position, to deliver current of a given polarity from said power cell to said motor to cause said pump means to pump fluid form said fluid canister to said fluid conduit, spring means for pressurizing fluid in said fluid canister and metering means in said power cell circuitry, said metering means being operable, when said switch is moved from said first position to said neutral position, to maintain the flow of current to said motor until the completion of one cycle.

* * * * *